(12) United States Patent
Stefanini et al.

(10) Patent No.: US 8,704,413 B2
(45) Date of Patent: Apr. 22, 2014

(54) ELECTROMAGNETIC STEP-BY-STEP WOBBLE-TYPE MICROMOTOR

(75) Inventors: Cesare Stefanini, Vicopisano (IT); Paolo Dario, Leghorn (IT); Maria Chiara Carrozza, Pisa (IT); Sarah De Cristofaro, Brindisi (IT)

(73) Assignee: Scuola Superiore di Studi Universitari e di Perfezionamento Sant'Anna, Pisa (IT)

( * ) Notice: Subject to any disclaimer, the term of this patent is extended or adjusted under 35 U.S.C. 154(b) by 399 days.

(21) Appl. No.: 13/121,129

(22) PCT Filed: Sep. 28, 2009

(86) PCT No.: PCT/IB2009/054239
§ 371 (c)(1),
(2), (4) Date: Mar. 25, 2011

(87) PCT Pub. No.: WO2010/035244
PCT Pub. Date: Apr. 1, 2010

(65) Prior Publication Data
US 2011/0210627 A1    Sep. 1, 2011

(30) Foreign Application Priority Data
Sep. 29, 2008   (IT) ................. FI2008A0185

(51) Int. Cl.
*H02K 37/02* (2006.01)
*H02K 37/00* (2006.01)
*H02K 7/10* (2006.01)

(52) U.S. Cl.
USPC .................. 310/49.48; 310/49.23; 310/49.37; 310/82

(58) Field of Classification Search
CPC .................................................. H02N 1/00
USPC .......... 310/49.01, 49.09, 49.17, 49.23, 49.37, 310/49.48, 154.38, 154.39, 156.36, 156.38, 310/156.46, 82
See application file for complete search history.

(56) References Cited

U.S. PATENT DOCUMENTS 3,355,648 A * 11/1967 Marie ........................... 318/781
3,845,335 A   10/1974 Oguey
(Continued)

FOREIGN PATENT DOCUMENTS

DE   4303363   8/1994
DE   4447284   7/1996
(Continued)

OTHER PUBLICATIONS

D'Atannasio documents (Sep. 7-11, 1997) and Jacobsen documents (Feb. 20-22, 1989) ( (webpage http://ieeexplore.ieee.org).*

(Continued)

*Primary Examiner* — Tran Nguyen
*Assistant Examiner* — Jose Gonzalez Quinones
(74) *Attorney, Agent, or Firm* — Steinfl & Bruno LLP (57) ABSTRACT

An electromagnetic step-by-step wobbling micromotor comprises an inner component and an annular component being external to the inner one. The outer component may be a stator and the inner component a rotor, or vice versa. The inner component has three or more poles with a winding on each pole, and an external surface facing an internal surface of the outer component. During the operation of the micromotor each winding is powered. The external and internal surfaces have toothed surfaces. Each tooth has a peak radius which is different from the valley radius.

12 Claims, 10 Drawing Sheets

(56) References Cited

U.S. PATENT DOCUMENTS

| | | | |
|---|---|---|---|
| RE29,411 | E | 9/1977 | Newell |
| 4,506,590 | A | 3/1985 | Miki et al. |
| 4,577,127 | A | 3/1986 | Ferree et al. |
| 4,922,164 | A | 5/1990 | Jacobsen |
| 5,093,594 | A | 3/1992 | Mehregany |
| 5,113,100 | A | 5/1992 | Taghezout |
| 5,206,554 | A | 4/1993 | Perrot |
| 5,216,310 | A | 6/1993 | Taghezout |
| 5,237,234 | A * | 8/1993 | Jebens et al. .......... 310/309 |
| 5,539,267 | A | 7/1996 | Fan |
| 5,804,898 | A | 9/1998 | Kawai |
| 6,794,789 | B2 | 9/2004 | Siess |
| 2001/0038258 | A1 | 11/2001 | Fischer et al. |
| 2002/0079748 | A1 | 6/2002 | Lee, II et al. |
| 2008/0224574 | A1 | 9/2008 | Enomoto et al. |

FOREIGN PATENT DOCUMENTS

| | | | |
|---|---|---|---|
| EP | 0565746 EP | | 9/1996 |
| FR | 2461392 | | 1/1981 |
| JP | 10-304646 | | 11/1998 |
| JP | 2002300758 A | * | 10/2002 |
| JP | 2007120750 | | 5/2007 |

OTHER PUBLICATIONS

International Search Report for PCT/IB2009/054239 filed Sep. 28, 2009 in the name of Scuola Superiore Di Studi Universitari E Di Perfezionamento Sant'Anna.

Written Opinion for PCT/IB2009/054239 filed Sep. 28, 2009 in the name of Scuola Superiore Di Studi Universitari E Di Perfezionamento Sant'Anna.

S. C. Jacobsen, R. H. Price, J. E. Wood, T. H. Rytting, M. Rafaelof, *The wobble motor: an electrostatic, planetary-armature, microactuator*, Proceedings Micro Electro Mechanical Systems (1989).

S. C. Jacobsen, R. H. Price, J. E. Wood, T. H. Rytting, M. Rafaelof, *The wobble motor: design, fabrication and testing of an eccentric-motion electrostatic microactuator*, Proceedings Micro Electro Mechanical Systems (1989).

W. Trimmer, R. Jebens, *An operational harmonic electrostatic motor*, Microelectromechanical systems, 1989, Proceedings, An investigation of micro structures, sensors, actuators, machines and robots, IEEE, pp. 13-16 (1989).

M. Meheregany, S. M. Philips, E. T. Hsu, J. H. Lang, *Operation of harmonic side-drive micromotors studied through gear ratio measurements*, Solid-State Sensors and Actuators, 1991, Digest of Technical Papers, Transducers 91, 1991 International Conference on, pp. 59-62 (1991).

T. Furuhata, T. Hirano, L. H. Lane, R. E. Fontana, L. S. Fan, H. Fujita, *Outer rotor surface-micromachined wobble micromotor*, MEMS '93, Proceedings 'An investigation of Micro Structures, Sensors, Actuators, Machines and Systems'. IEEE MicroEiectro Mechanical Systems (1993).

V. R. Dhuler, M. Mehregany, S.M. Phillips, *An experimental technique and a model for studying the operation of harmonic side-drive micromotors*, IEEE transactions on electron devices, vol. 40, No. 11 (1993).

J. Corda, *Cylindrical linear stepper motor*, IEE Colloquium on Stepper Motors and Their Control (1994).

K. Deng, M. Meheregany, *Outer-rotor polysilicon wobble micromotors*, MEMS '94, Proceedings, IEEE Workshop on Micro Electromechanical Systems (1994).

L. Paratte, H. Lorenz, R. Luthier, R. Clavel, N. F. de Rooij, *Miniature gear reduction unit driven by a silicon electrostatic wobble motor*, Micro Electro Mechanical Systems, 1994. MEMS '94, Proceedings, IEEE Workshop on, pp. 119-123 (1994).

K. Nakamura, H. Ogura, S. Maeda, U. Sangawa, S. Aoki, T. Sato, *Evaluation of the micro wobble motor fabricated by concentric build-up process*, Proceedings IEEE Micro Electro Mechanical Systems (1995).

A. M. Jungreis, A. W. Kelley, *The axial air gap wobble motor- an appropriate topology for magnetic micromotors*, 13th 1AS Annual Meeting, 1AS '95, Conference Record of the Industry Applications Conference (1995).

Hiroyuki Fujita, Tetsuhiko Iizuka, *A threaded wobble motor- a micro motor generating large linear displacement*, Transducers '95, Eurosensors IX, the 8th international conference on solid-state sensors and actuators, and eurosensors IX, Stockholm, Sweden, (Jun. 25-28, 1995).

A.J. Sangster, V. D. Samper, K. Shea, R. L. Reuben, E. Yang, *High power LIGA wobble motors for arterial plaque removal*, The institution of electrical engineer, (1996).

Hiroyuki Fujita, Tetsuhiko Iizuka, *A threaded wobble motor with a 6-pole stator—a micro motor generating large linear displacement*, Seventh International Symposium on Micro Machine and Human Science 0-7803-3596-1/96 (1996) IEEE.

C. Stefanini, M. C. Carrozza, P. Dario, *A mobile microrobot driven by a new type of electromagnetic micromotor*, Seventh International Symposium on Micro Machine and Human Science 0-7803-3596-1/96 (1996) IEEE.

K. Suzumori, K. Hori, *Micro electrostatic wobble motor with toothed electrodes*, 10th annual international workshop on micro electro mechanical systems, MEMS '97, Proceedings IEEE (1997).

S. D'Attanasio, R. Lazzarini, C. Stefanini, M. C. Carrozza, P. Dario, *A one cubic centimeter mobile microrobot with a steering control*, Proc. IROS 97 0-7803-4119-8/97 (1997) IEEE.

A.J. Sangster, V. D. Samper, *Accuracy assessment of 2-D and 3-D finite element models of a double-stator electrostatic wobble motor*, Journal of Microelectromechanical Systems, vol. 6, No. 2 (Jun. 1997).

P. Dario, M. C. Carrozza, C. Stefanini, S. D'Attanasio, *A Mobile Microrobot Actuated by a New Electromagnetic Wobble Micromotor*, IEEE/ASME Transactions on Mechatronics, vol. 3, No. 1, (Mar. 1998).

Rob Legtengerg, Erwin Berenschot, Jhon var Baar, Miko Elwenspoek, *An electrostatic lower stator axial-gap polysilicon wobble motor part 1: design and modeling*, Journal of Microelectromechanical Systems, vol. 7, No. 1 (Mar. 1998).

Rob Legtengerg, Erwin Berenschot, Jhon var Baar, Miko Elwenspoek, *An electrostatic lower stator axial-gap polysilicon wobble motor part II: fabrication and performance*, Journal of Microelectromechanical Systems, vol. 7, No. 1 (Mar. 1998).

A.J. Sangster, V. D. Samper, R. L. Reuben, U. Wallrabe, *Torque evaluation of a LIGA fabricated electrostatic micromotor*, Journal of Microelectromechanical Systems, vol. 8, No. 1 (Mar. 1999).

R. Kondo, S. Takimoto, K. Suzuki, S. Sugiyama, *High aspect ratio electrostatic micro actuators using LIGA process*, Microsystem technologies; 6 (6) : 218-221 (Nov. 2000).

A. Endemano, M. P. Y. Desmulliez, M. Dunnigan, *System level simulation of a double stator wobble electrostatic micromotor*. Sensors and Actuators A-PHYS 99 (3): 312-320 (Jun. 5, 2002).

K. Okamoto, K. Suzumori, T. Kanda, Y. Yamada, *Development of three-chamber micro pneumatic wobble motor*, Machine design and tribology division meeting in JSME, vol. 6, 295-297 (2006).

Onishi machine translation of Japanese Publication 2002-300758 published on Oct. 11, 2002 in the name of JAPAN SERVO.

* cited by examiner

| VARIABLE | NAME |
|---|---|
| RADIUS OF THE ROTOR NOMINAL CIRCUS | $R_S$ |
| RADIUS OF THE STATOR NOMINAL CIRCUS | $R_R$ |
| STATOR TEETH NUMBER | $z$ |
| STATOR TOOTH FOOT ARC RADIUS | $R_{iS}$ |
| ROTOR TOOTH TIP ARC RADIUS | $R_{iR}$ |
| STATOR TOOTH TIP ARC RADIUS | $R_{eR}$ |
| ROTOR TOOTH FOOT ARC RADIUS | $R_{eS}$ |
| CENTRAL ANGLE OF THE TOOTH SPACE ON THE STATOR NOMINAL CIRCUS | $2\theta_S$ |
| CENTRAL ANGLE OF THE TOOTH SPACE ON THE ROTOR NOMINAL CIRCUS | $2\theta_R$ |
| ANGULAR EXTENT OF STATOR TOOTH TIP ARC | $\alpha$ |
| ANGULAR EXTENT OF STATOR TOOTH FOOT ARC | $\beta$ |

ELECTROMAGNETIC STEP-BY-STEP WOBBLE-TYPE MICROMOTOR

CROSS REFERENCE TO RELATED APPLICATIONS

The present application is the US national stage of International Application PCT/IB2009/054239 filed on Sep. 28, 2009, which in turn, claims priority to Italian Patent Application No. FI2008A000185 filed on Sep. 29, 2008.

TECHNICAL FIELD

The present invention refers in general to variable reluctance motors and, more specifically, to variable reluctance step-by-step motors with wobble type behaviour. Even more specifically, the invention concerns motors of the aforementioned type with a diameter of less than 10 mm.

STATE OF THE ART

Variable reluctance step-by-step motors are generally made up of one or more stators, made with strips of ferromagnetic material (for example soft steel) and characterised by the presence of a certain number of polar expansions around which conductive wire is wound, and a mobile component again made with strips of ferromagnetic material, generally known as a rotor, formed with polar expansions interacting with those of the stator in order to provide a path for the concatenation of the magnetic flux generated by the power of the stator coils.

The main advantage of the step-by-step motor is that it is driven in an open loop: under normal conditions of use, for a number n of impulses a displacement of n steps is obtained. Step-by-step motors are used in a number of applications, like for example: photocopiers, typewriters, printers, computer peripherals, drawing tables, instrumentation, pumps for medical use, motorised syringes, vending machines, electronic games, automobiles, air-conditioning, control systems.

It is worth considering in detail which are the main characteristic of step-by-step motors and evaluating the advantages: the absence of brushes eliminates the problem of wear, thus increasing the lifetime of the motor; operation in an open loop eliminates the need for encoders, thus cutting costs; the possibility of having fine angular steps (minimum value 1.8°) allows them to be used in precise systems; the use of digital signals to control the motor allows easy integration thereof in a complex system; the electromagnetic operating principle characterised by low supply voltages makes a wide range of applications possible, from battery-fed portable electronic systems to medical devices in which a high safety margin is required.

Wobble motors can essentially be split into two categories: motors with axial mechanical clearance and those with radial mechanical clearance. In the first type, the rotor is positioned above the stator, while in the second type the rotor does not rotate around a fixed rotation axis, but rather the rotation axis follows a circular path, concentric to the circumference defined by the polar expansions of the stator. The rotor is in contact with the stator at the rotation point and with respect to said point a torque will be generated the nature of which is a function of the physical principle which the operation of the motor is based on (electrostatic, pneumatic, electromagnetic, etc.). At the point of rotation the constraint reactions are balanced both by friction and by the geometric characteristics of the profile of the rotor and stator surfaces.

Wobble motors have all of the advantages of step-by-step motors. In addition, the forward motion resulting from the mutual rolling of rotor and stator, together with the presence of suitable matching profiles (gearing) on the stator and rotor surfaces, eliminates the need for mechanical reducers to reduce the rotation speed and to increase the driving torque. Thanks to the presence of an intrinsic reduction mechanism there is an increase in torque and a finer angular resolution.

The description of the present application includes a list of publications that reflect the state of the art according to what has been identified by the inventors. Electromagnetic wobble micromotors are, for example, known from [24], [27] and [30].

From the state of the art it can be seen that there is a need for high angular resolution of the motor combined with it being simple to make.

SUMMARY OF THE INVENTION

According to a first aspect of the present invention an electromagnetic step-by-step wobble micromotor is provided, comprising: an internal component with three or more poles; a winding on each pole of the internal component; an annular component external to the internal component; in which: the internal component has an internal component external surface and the external component has an external component internal surface, the internal component external surface and the external component internal surface being adapted to be placed in direct contact along a portion thereof; the internal component external surface and the external component internal surface have a teethed configuration, each tooth having a peak radius of curvature and a valley radius of curvature, the peak radius of curvature being different from the valley radius of curvature; and during an operational mode of the electromagnetic micromotor, each winding is in a powered condition.

Further aspects of the present invention are set forth in the claims of the present application.

The motor according to the present invention has high angular resolution and is simple to make. Further advantages of the micromotor of the present invention include: easy drive control (due to the need for digital signals); easy miniaturisation linked to the ease of manufacture; customizable angular resolution (even <1°) since it strictly depends on the number of teeth that it has been decided to make, which in turn depends on the manufacturing technique used.

Moreover, the internal teething eliminates the need for an external reducer, in turn removing the risk of breaking of the gears and the presence of clearance; good output torque, of a value comparable to the corresponding DC motors, but of larger size; efficiency of around 10%; low power consumption, of the order of a few mW.

BRIEF DESCRIPTION OF THE FIGURES

FIGS. 2(a)-2(n) show the operating principle of the micromotor of the present invention;

FIGS. 8(*a*), 8(*b*) and 8(*c*) show front and perspective views of a first embodiment of the internal and external components [FIG. 8(*a*)], of the external component with relative example of peak and valley radii of curvature [FIG. 8(*b*)], and of the internal component with relative example of peak and valley radii of curvature [FIG. 8(*c*)];

FIGS. 9(*a*) and 9(*b*) show front and perspective views of a second embodiment of the external component with relative example of peak and valley radii of curvature [FIG. 9(*a*)], and of the internal component with relative example of peak and valley radii of curvature [FIG. 9(*b*)];

FIGS. 10(*a*) and 10(*b*) show front and perspective views of a third embodiment of the external component with relative example of peak and valley radii of curvature [FIG. 10(*a*)], and of the internal component with relative example of peak and valley radii of curvature [FIG. 10(*b*)];

FIGS. 12(*a*) ed 12(*b*) show perspective views of two embodiments of the micromotor according to the present invention: three poles [FIG. 12(*a*)] and five poles [FIG. 12(*b*)].

DETAILED DESCRIPTION OF THE INVENTION

The micro-motor according to the present invention is essentially a variable reluctance wobble motor, with step-by-step type behaviour, comprising an internal component with three or more poles, on each of which a winding of conductive wire is made, and an external annular component.

For the sake of simplicity the name stator will be used to indicate the internal component and the name rotor will be used to indicate the external component, but there is no reason why the internal component cannot be the one that is set in rotation, and thus be defined as the rotor, and the external component be fixedly connected to the frame, and thus be defined as the stator.

Figure 8:
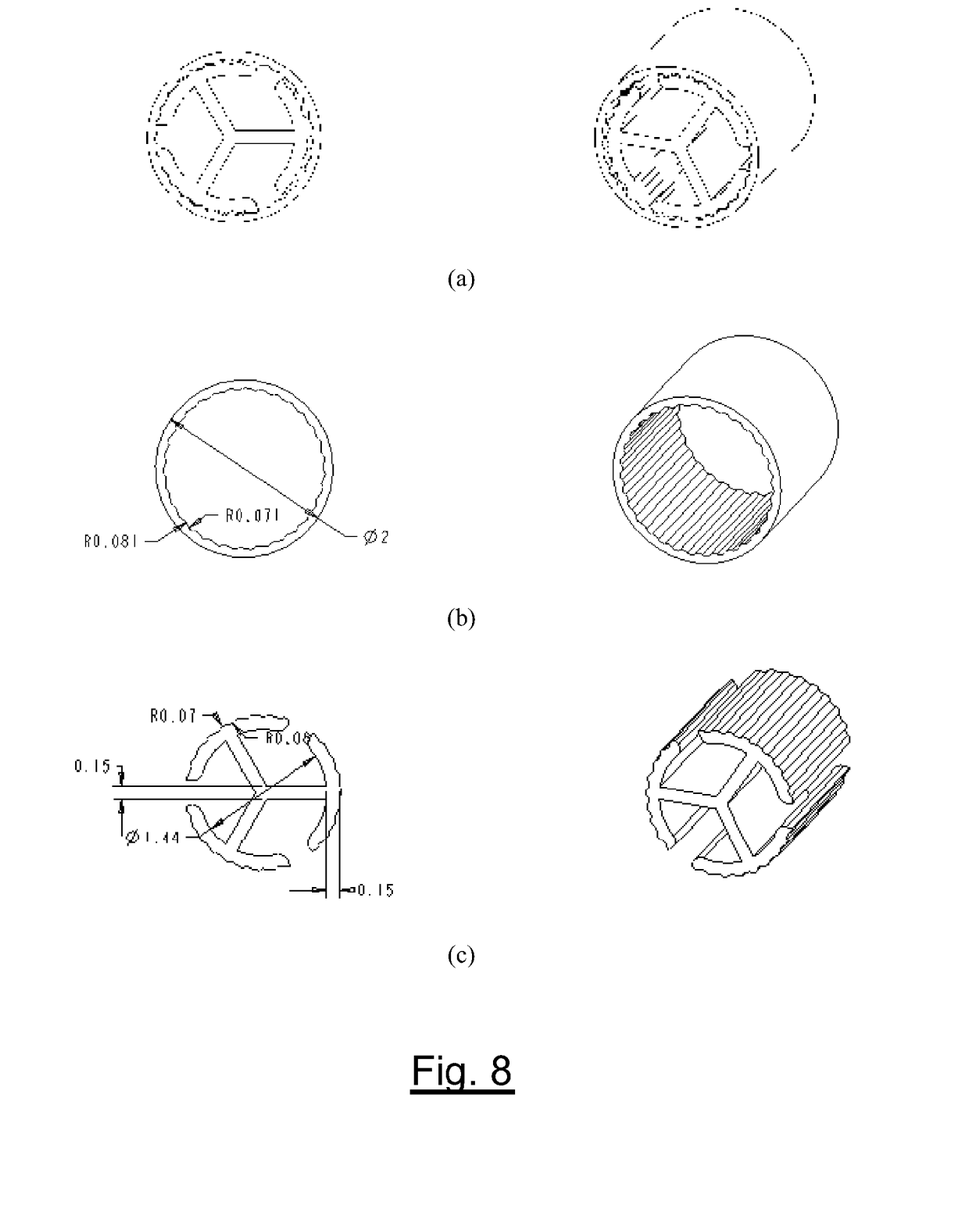
Figure 9:
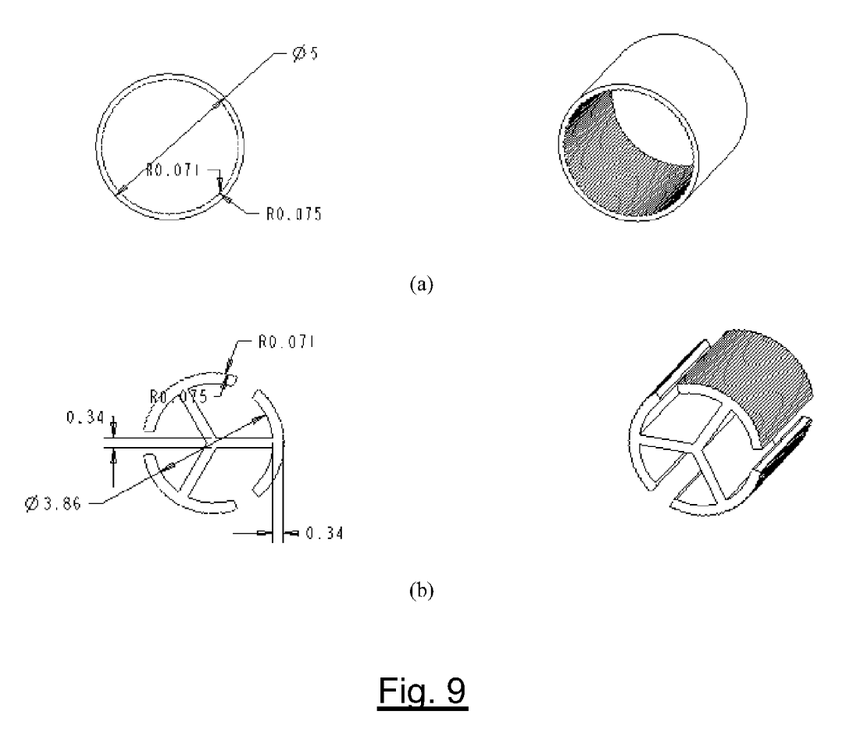
Figure 10:
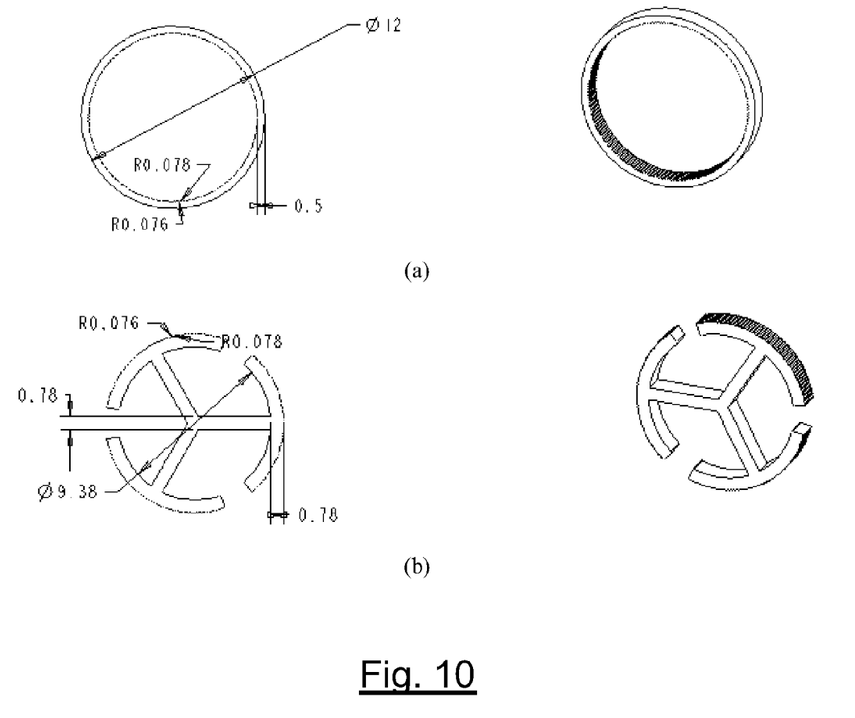

In order to solve the problem of sliding and of the reduction of the rotor-stator gap, the size of which involves more or less dispersion of the magnetic flux in the gap, the present description has embodiments with teethings both of the outer surface of the stator and on the inner surface of the rotor. See, for example, FIGS. 8, 9 and 10.

In particular, the profile of the teething is in arcs of circumference, in which the teeth of each profile are characterised by two different radii of curvature: one peak and one valley. This type of profile provides a softer teething such as to ensure the pure rolling of the mobile component on the fixed one and a reduction of the rotor-stator gap, i.e. a reduction of the reluctance of the gap, but of a value such as to prevent jamming due to impurities and dirt linked to the machining of the piece.

Figure 1:
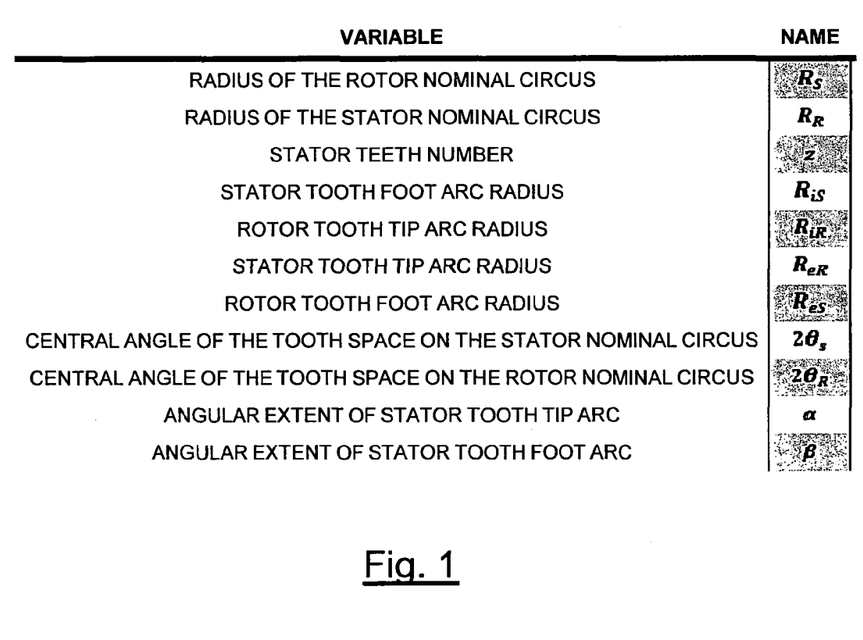
FIG. 1 shows a table in which the terminology of the magnitudes discussed during the present specification is described.

For the nomenclature used in the definition of the magnitudes necessary to characterise the teethed profile we refer to the table shown in FIG. 1, in which the terminology of the magnitudes discussed during the present specification is described.

Figure 11:
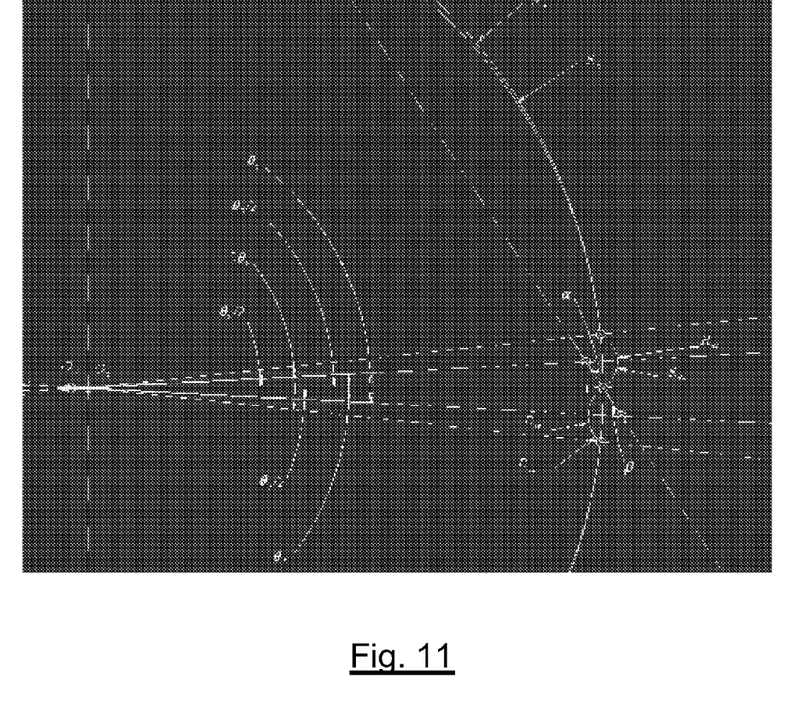
FIG. 11 shows a geometric diagram indicating parameters characterising an embodiment of the teethed profile of the external and internal components of the micromotor of the present invention.

Reference can be made, in particular, to FIG. 11, which shows a geometric diagram indicating parameters characterising an embodiment of the teethed profile of the external and internal components of the micromotor of the present application. More specifically, two nominal circumferences of radius $R_S$ ed $R_R$ are defined that formally represent the geometric location of the inflection points that characterise the profile, respectively, of the stator teeth and rotor teeth; the inflection points, of course, being the points at which the two arcs forming the peak and the valley of a single tooth are tangent.

Relationships, based on both kinematic and geometric considerations, have been identified that allow the aforementioned parameters to be univocally determined. According to an embodiment of the present invention, in the sizing it can be ensured that first there is no sliding between the rotor and stator surface during operation and that it is easy to manufacture (so as to be able to easily pass through a moulding process rather than through EDM [electro-discharge machining] for possible production in great numbers). At the same time, the sizing can be such as to also take into consideration the electromechanical performance of the motor, since the minimum value of the gap between stator and rotor surface (linked mainly to the softness of the teethed profile) is a trade-off between the need to reduce the gap to reduce the losses in the gap and thus increase electromagnetic performance, and the need to have a gap that prevents the rotor from jamming due to surface impurities linked to the machining process.

For example, in order to ensure an angular resolution of less than 2° it is possible to choose to set the minimum distance between the number of stator and rotor teeth, thus equal to one tooth, and to foresee a large number of teeth, of the order of hundreds. Indeed, considering the kinematics of the motor, after one complete rotation the external ring will be rotated by an amount that is directly proportional to the difference between the number of stator and rotor teeth. Analogously to the sizing of the gear wheels, in order to ensure engagement, it is possible to set a condition that the stator and rotor steps must be equal, which results in a relationship between the two radii, once the angular size of a tooth, peak plus valley, has been expressed for the stator and for the rotor according to the respective number of teeth.

Purely geometrical considerations allow the remaining relationships to be defined. In order to solve the problem a combination of three independent variables should be provided, which have been selected to be $R_R$, a and z. The value to be assigned to $R_R$ is closely linked to the final size of the motor, and therefore it is necessarily a parameter that needs to be defined a priori. On the other hand, with regard to a, it has been selected because it is an excellent indication of the depth of the tooth and thus of the more or less graduality of the profile. The last parameter to be defined a priori, as stated, is the number of stator teeth to ensure the required angular resolution. The addition of a consideration on the minimum value of the rotor-stator gap (for example 30 μm), once the value of $R_R$ has been set, makes it possible to determine an upper limit of the number of teeth that can be used, also taking into consideration the limits set by the machining process.

With regard to the manufacturing process, given the high degree of precision required to avoid jamming, a possible solution is machining the piece with EDM (Electro-Discharge Machining) rather than with machine tools. The choice of the machining technique makes it possible to have an idea of the minimum dimensions that can be made: the use of EDM involves having less restriction on the size of the radii of the teething essentially linked to the size of the wire used for electroerosion.

FIGS. 2(a)-2(n) show the operating principle of the micromotor according to the present invention. FIG. 2(a) shows the initial phase of a first step. FIG. 2(b) shows the intermediate phase of the first step. FIG. 2(c) shows the final phase of the first step and at the same time the initial phase of the second step. FIG. 2(d) shows the intermediate phase of the second step, and so on. The direction of the currents is expressed in vector notation.

Figure 2:
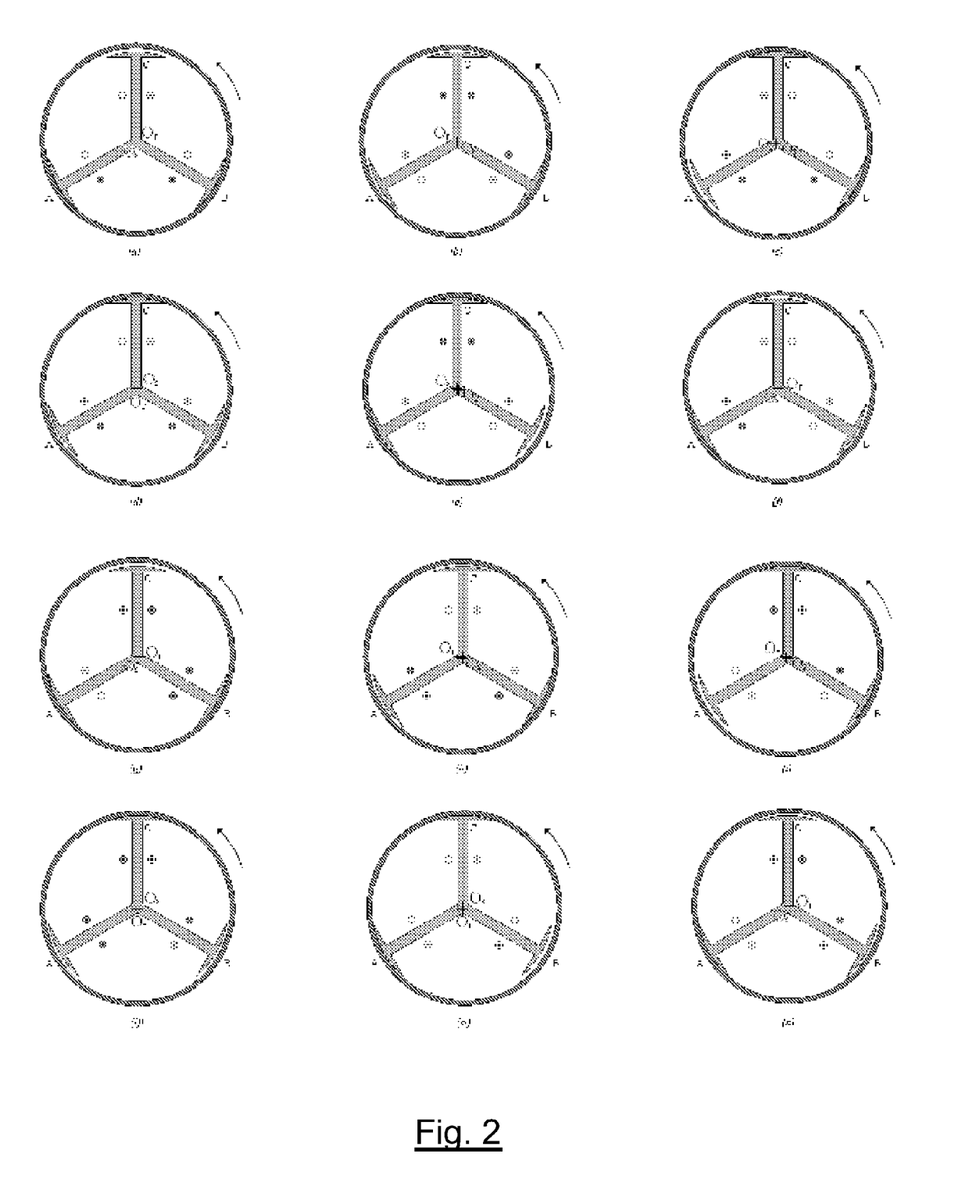

FIGS. 2(a)-2(n) are such as to show a complete power cycle, consisting of six phases, in each of which all three of the windings are powered so as to create a magnetic field that closes upon the rotor ring thus generating an electromagnetic attraction force between it and the poles. Taking the positions at which the rotor is in contact with the two polar expansions simultaneously to be the initial and final positions, it is possible to define the positions shown in FIGS. 2 (b), (d), (f), (h), (l) and (n) as intermediates, as noted above, where the rotor is in contact with a single polar expansion.

Figure 7:
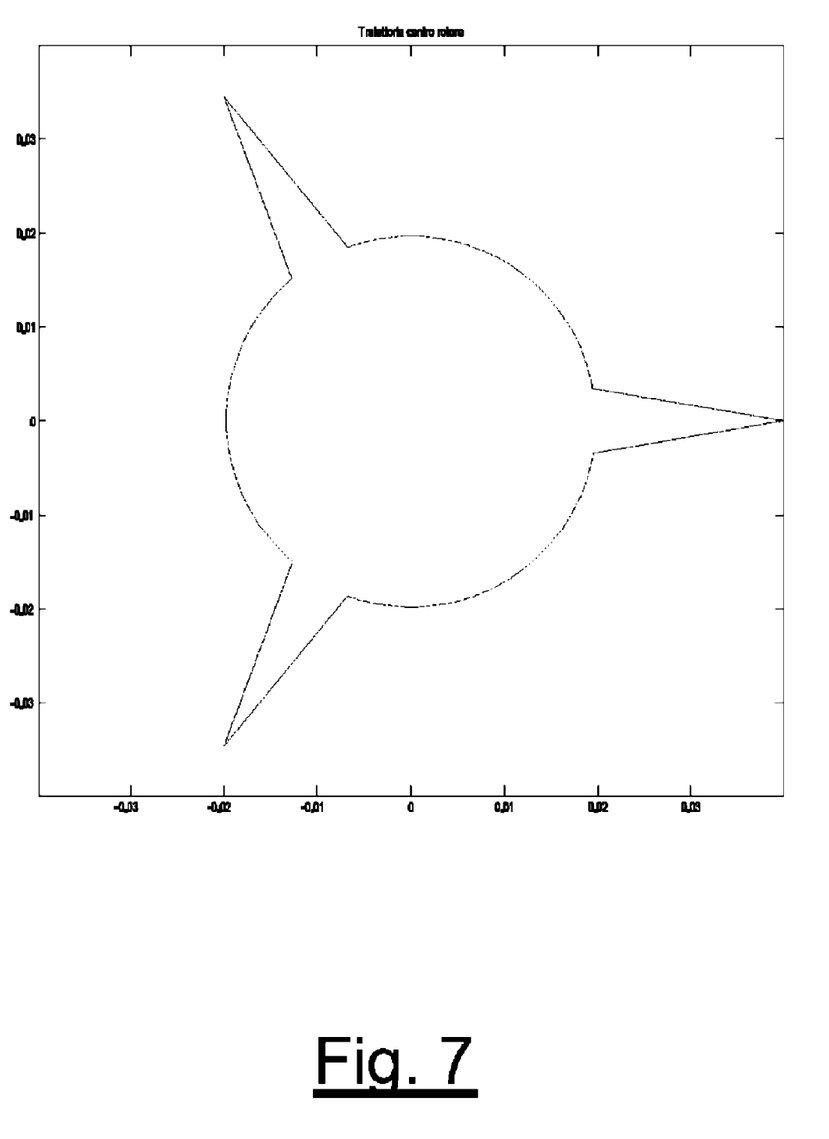
FIG. 7 is a diagram showing the trajectory of the centre of the mobile component with respect to the centre of the fixed component.

The resulting motion of the rotor derives from the successive rotations on the polar surfaces of the stator that result in the description of a closed three-lobed trajectory of the centre of the rotor around the centre of the stator. In order to give greater detail, FIG. 7 shows the trajectory of the centre of the rotor with respect to the centre of the stator (having coordinates (0, 0) in the example of the figure) according to an embodiment of the present invention, in which the rotor-stator gap is for example equal to 40 μm. In such an embodiment, the trajectory is valid for each of the motors that can be made. The circumferential portions represent the phases in which the rotor rolls over one of the polar expansions of the stator, whereas the cusps represent the areas in which there is passage from one polar expansion to the other. Indeed, the circumferential portions represent the trajectory of the centre of the primitive rotor circumference during its rolling over the stator one, since the centre of the rotor during rolling over each expansion undergoes a fluctuation due to the presence of the teething (closely linked to the angle α, which, as already stated, is an indication of the depth of the tooth) with respect to the primitive circumference.

The teething on the rotor and stator surfaces makes it possible to have a pure rolling of the rotor over the stator and to obtain gaps of the order of μms, for example 30 or 40 μm.

In each step the transition between the final and initial position can be analysed in detail starting from the diagram of FIG. 2 and considering the configurations (a), (b) and (c) of FIG. 2. As already noted earlier, in the initial configuration of FIG. 2(a) the polar surfaces A and B are in contact with the external ring (rotor), whereas in the final configuration of FIG. 2(c) the expansions B and C are in contact. The passage from one configuration to the other is obtained kinematically by means of a finite rotation of the rotor, free to move radially, over the surface of the expansion B (see FIG. 2(b)) and electrically by a variation in excitation of the winding in A and in C, maintaining the state of that in B.

Figure 3:
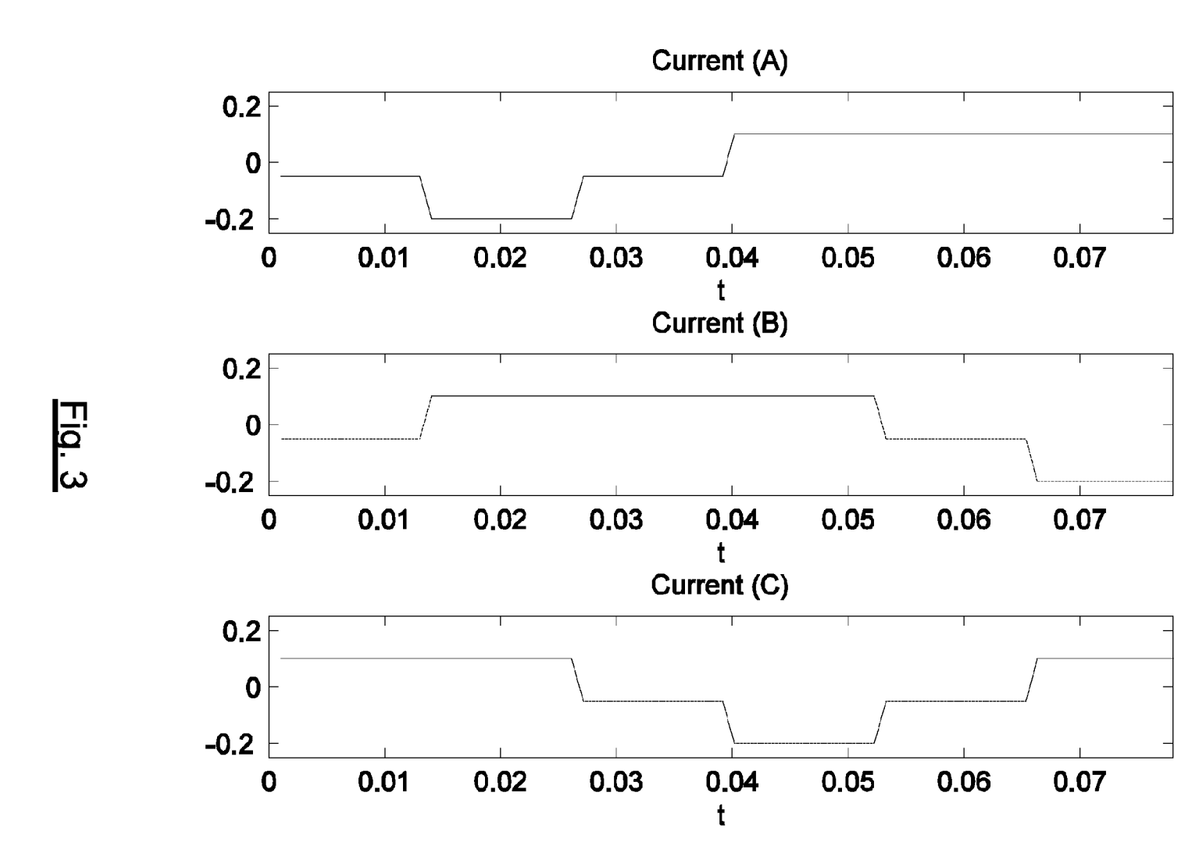
FIG. 3 shows a time diagram of the power currents of the poles A, B, C of the micromotor.

FIG. 3 shows a time diagram of the power currents of the poles A, B, C of the micromotor according to the present invention. In particular, the progression of the power currents intended to control the movement of the micromotor according to an embodiment of the present invention is shown.

It should be observed that at every moment the coils are powered and are never in a zero current state. Since the torque that generates the rotation is due to the occurrence of electromagnetic attraction forces between each stator polar expansion and the rotor ring, in turn linked to the magnetic fluxes, the waveforms of the currents can be selected based on an analysis of the distribution of the aforementioned magnetic fluxes in static conditions of transition from the initial position to the final position.

In particular, observing the aforementioned FIGS. 2(a) and 2(b), the power of the stator coils is different. Indeed, in FIG. 2(b), the power set-up corresponds to that shown in FIG. 3 at time t=0. The combination of currents proposed makes it possible to obtain a magnetic flux tending to zero at the polar expansion A, which results in an attraction force of practically zero and, in turn, into a negligible resistant moment. The transition to the position in FIG. 2(c) thus occurs only thanks to the magnetic attraction forces present at the polar expansions B and C that generate an anti-clockwise moment.

In other words, by eliminating the flux there is no generation of a magnetic attraction force opposing the rotation of the motor given by the forces due to the fluxes concatenated at the other two expansions, which means a substantially greater value of the output driving torque with respect to corresponding magnetic and electrostatic motors, comparable in intensity to the values reached by DC motors present on the market.

The geometric sizing both of the stator and of the rotor can be carried out, once the overall size of the motor is known, in such a way that, for certain power conditions, the material never exceeds the saturation induction value (since this conditions would result in a wasted power consumption and, therefore, in a reduction in efficiency of the motor itself). In order to determine the optimal geometric parameters, the system can be modelled so as to define the relationships existing between them and the electromagnetic parameters by using a schematisation of the motor with concentrated parameters.

Figure 4:
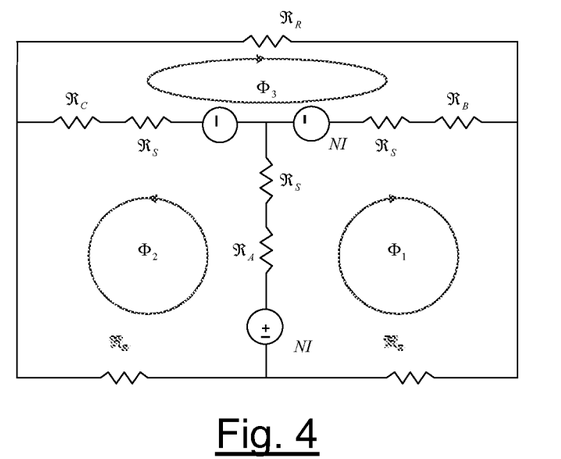
FIG. 4 shows a circuit diagram with concentrated parameters of the micromotor according to the present invention.

In particular, FIG. 4 shows a diagram with concentrated parameters of the micromotor according to the present application. NI indicates the electromotive force. R indicates the equivalent reluctance. The subscripts respectively represent: S stator; R rotor; A reluctance in the gap at expansion A; B reluctance in the gap at expansion B; C reluctance in the gap at expansion C.

The generalised Ohm's law allows the currents to be calculated to respect the required zero flux condition. In the different portions the reluctance is determined by taking into account the non-uniform geometries of each individual polar expansion and of the gap. In particular, some additional considerations are required to determine the expression of the reluctances in the gap.

Figure 5:
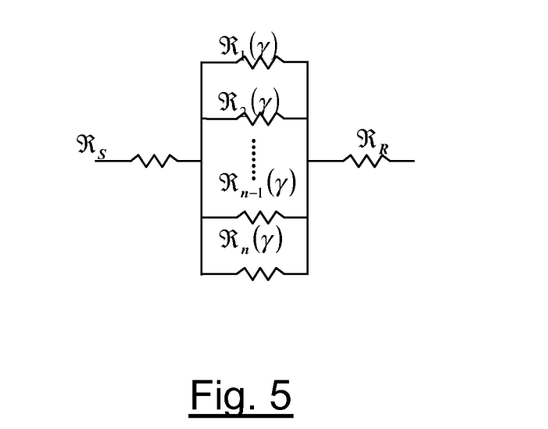
FIG. 5 shows the circuit diagram of the gap area of the micromotor according to the present invention.

FIG. 5 shows the circuit diagram of the gap area of the micromotor according to the present invention. In particular, such a figure shows how the equivalent circuit would be schematised at each gap, since the distance between the stator and rotor surface is variable along the arc $R_S \Psi$. Each reluctance is determined in said arc according to the angular position. If the arc $R_S \Psi$ is divided into n points, in each of them the reluctance can be calculated as per definition, considering the length of the path as the value of the distance between polar expansion and rotor surface in the same point, $h_{gap}$, and, considering as surface normal to the path an intermediate surface, assumed to be equal for any calculated reluctance and equal to $(R_S + \bar{h}_{gap(i)}) \cdot \Psi \cdot h$.

Figure 6:
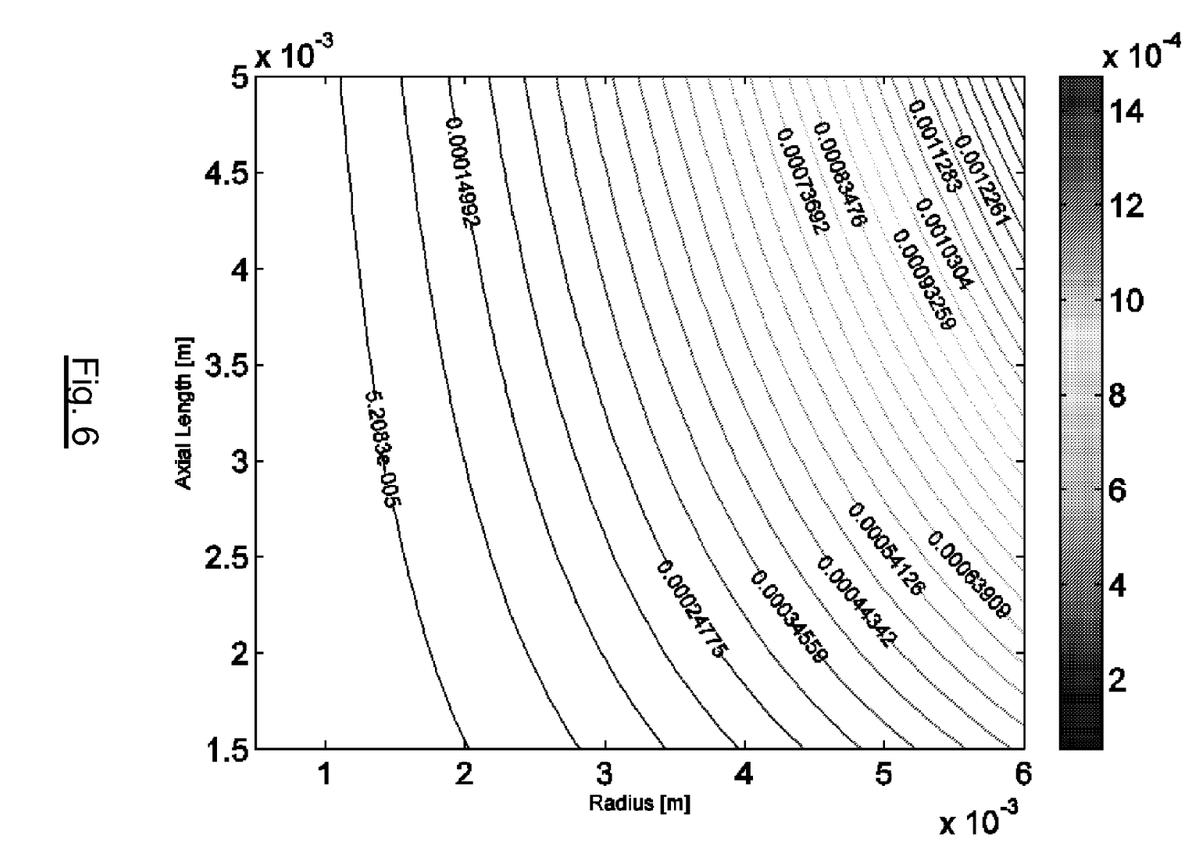
FIG. 6 is a diagram showing the performance of the motor according to the present invention, in terms of output torque [Nm] as a function of the variation of the overall dimensions [m] (axial length and internal diameter)

From the electromagnetic modelling with concentrated parameters of the motor it is possible to define a graph that for every combination of rotor radius and axial length of the motor allows the corresponding torque value to be extrapolated. FIG. 6 makes it possible not only to have information on the maximum obtainable torque [Nm] for a given combination of radius and height, but, should the overall size not be the main problem, also to determine the radius and height values that ensure that a specific output torque value is obtained.

In order to demonstrate the validity of the mathematical model, three different motors have been made.

In particular, FIGS. 8(a), 8(b) and 8(c) show front and perspective views of a first embodiment of the internal and external components [FIG. 8(a)], of the external component with relative example of peak and valley radii of curvature [FIG. 8(b)], and of the internal component with relative example of peak and valley radii of curvature [FIG. 8(c)]. In such a first embodiment, the rotor has an external φ of 2 mm and an axial length of 2 mm. The stator has 3 protruding poles. The number of stator teeth is equal to z=47; the teeth are characterised by the following radii of curvature (for the nomenclature refer to the table of FIG. 1): $R_{is}$=0.08 mm; $R_{es}$=0.07 mm; $R_{ir}$=0.081 mm; $R_{er}$=0.071 mm.

FIGS. 9(a) and 9(b) show front and perspective views of a second embodiment of the external component with relative example of peak and valley radii of curvature [FIG. 9(a)], and of the internal component with relative example of peak and valley radii of curvature [FIG. 9(b)]. In such a second embodiment, the rotor has an external φ of 5 mm and an axial length of 5 mm. The stator has 3 protruding poles. The number of stator teeth is equal to z=78; the teeth are characterised by the following radii of curvature (for the nomenclature refer to the table of FIG. 1): $R_{is}$=0.08 mm; $R_{es}$=0.07 mm; $R_{ir}$=0.081 mm; $R_{er}$=0.071 mm.

FIGS. 10(a) and 10(b) show front and perspective views of a third embodiment of the external component with relative example of peak and valley radii of curvature [FIG. 10(a)], and of the internal component with relative example of peak and valley radii of curvature [FIG. 10(b)]. In such a third embodiment, the rotor has an external φ of 12 mm and an axial length of 1.5 mm. The stator has 3 protruding poles. The number of stator teeth is equal to z=176; the teeth are characterised by the following radii of curvature (for the nomenclature refer to the table of FIG. 1): $R_{is}$=0.08 mm; $R_{es}$=0.07 mm; $R_{ir}$=0.081 mm; $R_{er}$=0.071 mm.

Figure 12:
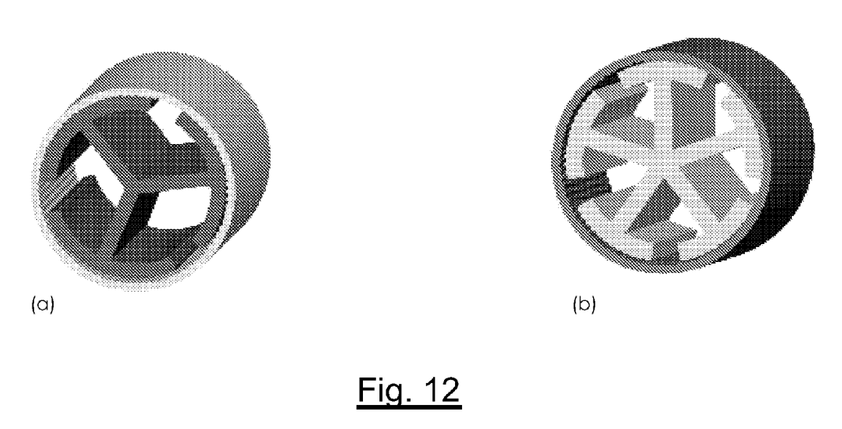

FIGS. 12(a) and 12(b) show perspective views of two embodiments of the stator of the micromotor according to the present application: stator with three poles [FIG. 12(a)] and stator with five poles [FIG. 12(b)].

The embodiment of the micromotor according to the present invention can undergo variations on different fronts:

Manufacturing technique: the cutting of manufacturing costs is an important aspect for the commercialisation of the product. The technique chosen for manufacture impacts heavily upon its costs, for which reason by going from manufacturing through EDM to manufacturing by plastic moulding costs should be cut without jeapordising the constructive simplicity of the system.

Packaging: different types of packaging can be considered, since it can be a function of the type of application. This means that not only it necessary to carefully select the materials, but also to come up with a suitable design. Indeed, it can be considered to make a gear or a cam for transmitting the motion on the outer surface of the rotor, or, if the place of application is particularly dirty, given the high sensitivity of the mechanism to dirt, a packaging that prevents the entry of dust, or furthermore, to make fittings on the outer surface of the rotor for the attachment of other mechanisms, or to connect a spindle.

Wobbling: should the application need this to be eliminated, it is possible to use interfaces based on transmission systems that are insensitive to translations between parallel axes, such as transmission joints between non-coinciding, elastic or articulated axes.

The simple structure and the low manufacturing cost of the motor allow a wide sector of the market to be targeted in which the actuator could be marketed:

In the field of consumer electronics the micromotor can be used in electromechanic chronographs, devices for moving the reading/writing head of a CD player, systems for focusing or zooming of camera devices. It could also be considered for use in smart phone cameras, since it is currently not possible to integrate its own focusing system due to the lack of suitable motors. The introduction of a motor of this calibre onto the market would bring a global improvement of performance of smart phone cameras, since it is currently not possible to fully take advantage of the resolution of the optical sensors precisely due to the fact that it is impossible to focus.

In the field of mechatronic biomedical microinstruments the motor can be used to actuate the lenses of endoscopes and in automated laparoscopy apparatuses, for example micro-pincers or micro-scalpels, micro-pumps for releasing drugs and intracorporeal autonomous endoscopic capsules in order to allow, for example, active locomotion or to actuate surgical micro-tools.

In the field of robotics, on the other hand, the micromotor according to the invention can have application in the precision positioning of micromanipulators, drug dosing systems, and mobile robots.

The present invention has been described with reference to some embodiments thereof presented as examples and not for limiting purposes. The scope of protection of the present invention should be considered to be outlined by the claims attached to the present application together with their equivalents.

PUBLICATION LIST

1. U.S. Pat. No. 3,845,335, (Oct. 29, 1974)
2. U.S. Pat. No. 4,506,590 (Mar. 26, 1985)
3. U.S. Pat. No. 4,577,127, (Mar. 18, 1986)
4. S. C. Jacobsen, R. H. Price, J. E. Wood, T. H. Rytting, M. Rafaelof, *The wobble motor: an electrostatic, planetary-armature, microactuator*, Proceedings Micro Electro Mechanical Systems (1989)
5. S. C. Jacobsen, R. H. Price, J. E. Wood, T. H. Rytting, M. Rafaelof, *The wobble motor: design, fabrication and testing of an eccentric-motion electrostatic microactuator*, Proceedings Micro Electro Mechanical Systems (1989)
6. W. Trimmer, R. Jebens, *An operational harmonic electrostatic motor*, Microelectromechanical systems, 1989, Proceedings, ?An investigation of micro structures, sensors, actuators, machines and robots', IEEE, pages: 13-16, 20-22 (February 1989)
7. U.S. Pat. No. 4,922,164 (May 1, 1990)
8. M. Meheregany, S. M. Philips, E. T. Hsu, J. H. Lang, *Operation of harmonic side-drive micromotors studied through gear ratio measurements*, Solid-State Sensors and Actuators, 1991, Digest of Technical Papers, TRANSDUCERS '91, 1991 International Conference on, pages 59-62 (24-27 Giugno 1991)
9. U.S. Pat. No. 5,093,594, (Mar. 3, 1992)
10. European patent application EP0565746A1 (Apr. 13, 1992)
11. U.S. Pat. No. 5,113,100 (May 12, 1992)
12. T. Furuhata, T. Hirano, L. H. Lane, R. E. Fontana, L. S. Fan, H. Fujita, *Outer rotor surface-micromachined wobble micromotor*, MEMS '93, Proceedings 'An investigation of Micro Structures, Sensors, Actuators, Machines and Systems'. IEEE MicroElectro Mechanical Systems (1993)
13. U.S. Pat. No. 5,206,554, (Apr. 27, 1993)

14. U.S. Pat. No. 5,216,310 (Jun. 1, 1993)
15. V. R. Dhuler, M. Mehregany, S. M. Phillips, *An experimental technique and a model for studying the operation of harmonic side-drive micromotors*, IEEE transactions on electron devices, vol. 40, no. 11 (November 1993)
16. J. Corda, *Cylindrical linear stepper motor*, IEE Colloquium on Stepper Motors and Their Control (1994)
17. K. Deng, M. Meheregany, *Outer-rotor polysilicon wobble micromotors*, MEMS '94, Proceedings, IEEE Workshop on Micro Electromechanical Systems (1994)
18. L-Paratte, H. Lorenz, R. Luthier, R. Clavel, N. F. de Rooij, *Miniature gear reduction unit driven by a silicon electrostatic wobble motor*, Micro Electro Mechanical Systems, 1994. MEMS '94, Proceedings, IEEE Workshop on, pages: 119-123 (Jan. 25-28, 1994)
19. K. Nakamura, H. Ogura, S. Maeda, U. Sangawa, S. Aoki, T. Sato, *Evaluation of the micro wobble motor fabricates by concentric build-up process*, Proceedings IEEE Micro Electro Mechanical Systems (1995)
20. A. M. Jungreis, A. W. Kelley, *The axial air gap wobble motor—an appropriate topology for magnetic micromotors*, 13$^{th}$ IAS Annual Meeting, IAS '95, Conference Record of the Industry Applications Conference (1995)
21. Hiroyuki Fujita, Tetsuhiko Iizuka, *A threaded wobble motor—a micro motor generating large linear displacement*, TRANSDUCERS '95, EUROSENSORS IX, the 8$^{th}$ international conference on solid-state sensors and actuators, and eurosensors IX, Stockholm, Sweden, (Jun. 25-28, 1995)
22. A. J. Sangster, V. D. Samper, K. Shea, R. L. Reuben, E. Yang, *High power LIGA wobble motors for arterial plaque removal*, The institution of electrical engineer, (1996)
23. Hiroyuki Fujita, Tetsuhiko Iizuka, *A threaded wobble motor with a 6-pole stator—a micro motor generating large linear displacement*, Seventh International Symposium on Micro Machine and Human Science 0-7803-3596-1/96 (1996) IEEE
24. C. Stefanini, M. C. Carrozza, P. Dario, *A mobile microrobot driven by a new type of electromagnetic micromotor*, Seventh International Symposium on Micro Machine and Human Science 0-7803-3596-1/96 (1996) IEEE
25. U.S. Pat. No. 5,539,267 (Jul. 25, 1996)
26. K. Suzumori, K. Hori, *Micro electrostatic wobble motor with toothed electrodes*, 10$^{th}$ annual international workshop on micro electro mechanical systems, MEMS '97, Proceedings IEEE (1997)
27. S. D'Attanasio, R. Lazzarini, C. Stefanini, M. C. Carrozza, P. Dario, *A one cubic centimeter mobile microrobot with a steering control*, PROC. IROS 97 0-7803-4119-8/97 (1997) IEEE
28. A. J. Sangster, V. D. Samper, *Accuracy assessment of 2-D and 3-D finite element models of a double-stator electrostatic wobble motor*, Journal of microelectromechanical systems, vol. 6, no. 2 (June 1997)
29. U.S. Re. 29,411 (Sep. 20, 1997)
30. P. Dario, M. C. Carrozza, C. Stefanini, S. D'Attanasio, *A Mobile Microrobot Actuated by a New Electromagnetic Wobble Micromotor*, IEEE/ASME TRANSACTIONS ON MECHATRONICS, VOL. 3, NO. 1, (March 1998)
31. Rob Legtengerg, Erwin Berenschot, Jhon var Baar, Miko Elwenspoek, *An electrostatic lower stator axial-gap polysilicon wobble motor part I: design and modeling*, Journal of Microelectromechanical Systems, vol. 7, No. 1 (March 1998)
32. Rob Legtengerg, Erwin Berenschot, Jhon var Baar, Miko Elwenspoek, *An electrostatic lower stator axial-gap polysilicon wobble motor part II: fabrication and performance*, Journal of Microelectromechanical Systems, vol. 7, No. 1, (March 1998)
33. U.S. Pat. No. 5,804,898 (Aug. 8, 1998)
34. Japanese patent application JP10-304646 (Nov. 13, 1998)
35. A. J. Sangster, V. D. Samper, R. L. Reuben, U. Wallrabe, *Torque evaluation of a LIGA fabricated electrostatic micromotor*, Journal of microelectromechanical systems, vol. 8, no. 1 (March 1999)
36. R. Kondo, s. Takimoto, K. Suzuki, S. Sugiyama, *High aspect ratio electrostatic micro actuators using LIGA process*, Microsystem technologies; 6 (6): 218-221 (November 2000)
37. US patent application 2001/0038258 (Nov. 8, 2001)
38. A Endemano, M. P. Y. Desmulliez, M. Dunnigan, *System level simulation of a double stator wobble electrostatic micromotor*, Sensors and Actuators A-PHYS 99 (3): 312-320 (Jun. 5, 2002)
39. U.S. Pat. No. 6,794,789 (Sep. 21, 2004)
40. K. Okamoto, K. Suzumori, T. Kanda, Y. Yamada, *Development of three-chamber micro pneumatic wobble motor*, Machine design and tribology division meeting in JSME, vol. 6 295-297 (2006)

The invention claimed is:

1. An electromagnetic step-by-step wobble micromotor, comprising:
an internal component of ferromagnetic material with three or more poles;
an electrical winding on each pole of the internal component; and
an annular component of ferromagnetic material external to the internal component, wherein:
the internal component has an internal component external surface and the external component has an external component internal surface, the internal component external surface and the external component internal surface being adapted to directly contact along a portion thereof;
the internal component external surface and the external component internal surface have a teethed configuration, each tooth having a peak radius of curvature and a valley radius of curvature, the peak radius of curvature being different from the valley radius of curvature; and
during an operational mode of the electromagnetic step-by-step wobble micromotor each winding is in a powered condition.

2. The micromotor of claim 1, wherein the internal component is a stator and the external component is a rotor.

3. The micromotor of claim 1, wherein the internal component is a rotor and the external component is a stator.

4. The micromotor according to claim 1, wherein the external component internal surface has a first number of teeth, the internal component external surface has a second number of teeth, the difference between the first number of teeth and the second number of teeth being greater or equal to one.

5. A method of using the micromotor of claim 1, wherein, during use, the micromotor proceeds from a first condition wherein the external surfaces of a first pole and a second pole of the internal component contact the external component internal surface, to a second condition wherein the external surfaces of the first pole and a third pole of the internal component contact the external component internal surface.

6. The method of using of claim 5, wherein, when proceeding from the first condition to the second condition, the external surface of the first pole stays in contact with the external component internal surface.

7. The method of using of claim 5, wherein, when proceeding from the first condition to the second condition, the power on the winding on the first pole is maintained at a fixed value, while the power on the windings on the second pole and third pole is varied.

8. The method of using of claim 7, wherein, when proceeding from the first condition to the second condition, the power on the winding on the first pole, the power on the winding on the second pole, and the power on the winding on the third pole are configured to provide a magnetic flux proximate to zero in correspondence of the second pole.

9. A device comprising the micromotor of claim 1, the device being selected from the group consisting of: electromecanic chronographs, devices for moving the reading/writing head of a CD player, systems for focusing or zooming of camera devices, smart phone cameras, mechatronic biomedic microinstruments, endoscope lens actuators, automatized laparoscopy apparatus, devices for fine positioning of micromanipulators, drug dosing systems, and mobile robots.

10. A process for manufacturing the micromotor of claim 1, comprising the step of machining the micromotor through electro-discharge machining (EDM).

11. A process for manufacturing the micromotor of claim 1, comprising the step of machining the micromotor through plastic molding.

12. The micromotor of claim 1, wherein the powered condition of each winding is always different from a zero current state during operation.

* * * * *